BEST AVAILABLE COPY
Oct. 9, 1934. C. MOONEY Des. Re. 19,340
MAIL BOX
Original Filed Sept. 21, 1931
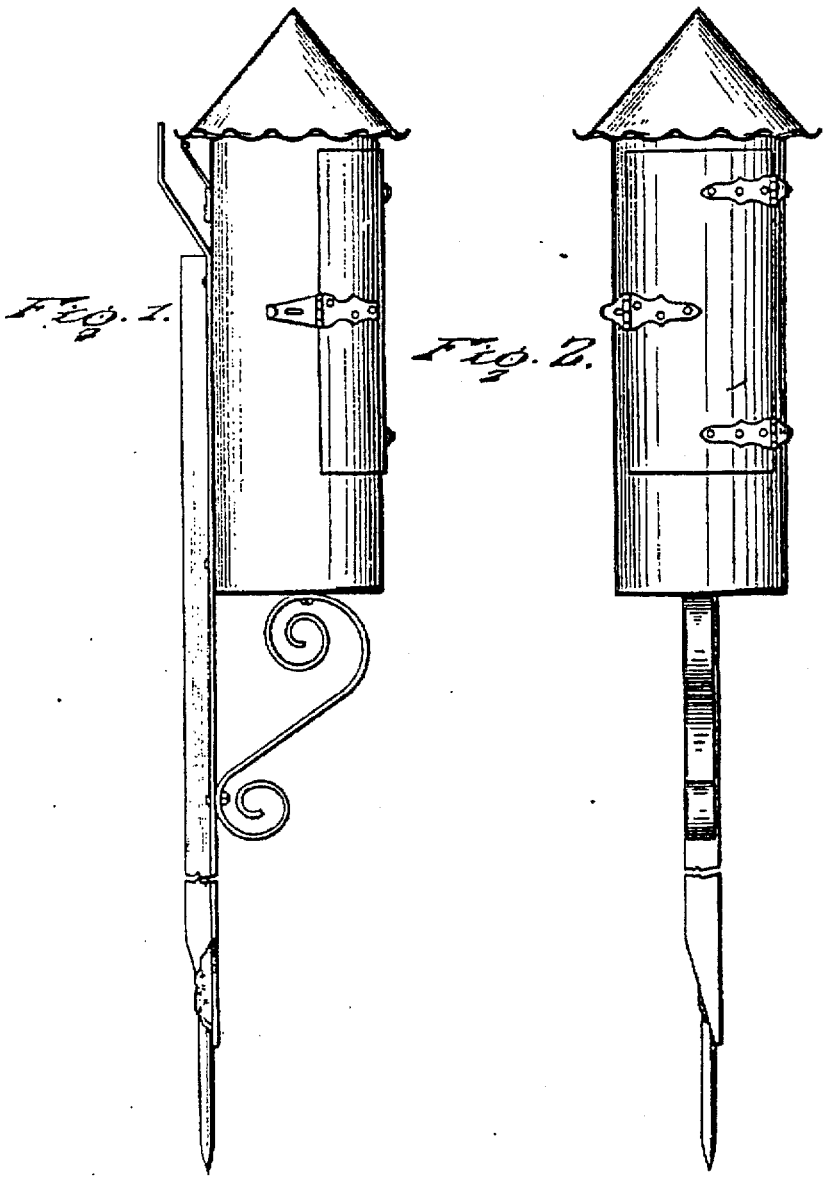
Inventor
Corinne Mooney.
By Lacey & Lacey, Attorneys Reissued Oct. 9, 1934

Des. Re. 19,340

BEST AVAILABLE COPY

UNITED STATES PATENT OFFICE 19,340

DESIGN FOR A MAIL BOX

Corinne Mooney, Memphis, Tenn.

Original No. 86,799, dated April 19, 1932, Serial No. 41,163, September 21, 1931, for 3½ years. Application for reissue May 8, 1934, Serial No. 51,724. Term of patent 14 years.

*To all whom it may concern:*

Be it known that I, CORINNE MOONEY, a citizen of the United States of America, residing at Memphis, in the county of Shelby and State of Tennessee, have invented a new, original, and ornamental Design for a Mail Box, of which the following is a specification, reference being had to the accompanying drawing, forming a part hereof.

In the drawing:

Figure 1 is a side elevation of a mail box showing my design.

Figure 2 is a front elevation of the same.

I claim:

The ornamental design for a mail box, as shown.

CORINNE MOONEY.